United States Patent [19]
Houston

[11] Patent Number: 6,095,755
[45] Date of Patent: *Aug. 1, 2000

[54] GAS TURBINE ENGINE AIRFOILS HAVING INCREASED FATIGUE STRENGTH

[75] Inventor: David Paul Houston, Glastonbury, Conn.

[73] Assignee: United Technologies Corporation, Hartford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,842

[22] Filed: Nov. 26, 1996

[51] Int. Cl.[7] ..................................................... F04D 29/38
[52] U.S. Cl. ........................................ 416/241 R; 416/224
[58] Field of Search ........................... 416/241 R, 223 A, 416/224; 428/621

[56] References Cited

U.S. PATENT DOCUMENTS

| | | |
|---|---|---|
| 4,005,989 | 2/1977 | Preston ...................................... 29/194 |
| 4,719,080 | 1/1988 | Duhl et al. ................................ 420/443 |
| 4,776,765 | 10/1988 | Sumner et al. ...................... 416/241 R |
| 4,832,993 | 5/1989 | Coulon ................................. 416/241 R |
| 4,884,820 | 12/1989 | Jackson et al. ............................ 277/53 |
| 5,486,096 | 1/1996 | Hertel et al. ............................. 416/224 |
| 5,538,796 | 7/1996 | Schaffer et al. ......................... 428/469 |
| 5,551,840 | 9/1996 | Benoit et al. ........................ 416/241 B |
| 5,591,009 | 1/1997 | Mannava et al. .................... 416/241 R |
| 5,712,050 | 1/1998 | Goldman et al. .................... 416/241 R |

FOREIGN PATENT DOCUMENTS 300667  6/1971  U.S.S.R. ................................. 416/224

*Primary Examiner*—John Kwon
*Attorney, Agent, or Firm*—John E. Boyd, Esq.; Whitman Breed Abbott & Morgan LLP

[57] ABSTRACT

An airfoil having improved fatigue strength is disclosed. The airfoil comprises a tip, a root section, a platform, and an airfoil section located between the tip and the platform. The airfoil section has a leading edge and a trailing edge. A metallic coating is located along the leading edge and the trailing edge excluding a portion of the leading edge and the trailing edge located near the platform.

31 Claims, 1 Drawing Sheet

GAS TURBINE ENGINE AIRFOILS HAVING INCREASED FATIGUE STRENGTH

BACKGROUND OF THE INVENTION

1. Technical Field

The invention relates generally to gas turbine engine airfoils and particularly to gas turbine engine airfoils having increased fatigue strength.

2. Background Information

Modern gas turbine engines, particularly those used in aircraft, operate at high rotational speeds and high temperatures for increased performance and efficiency. There is a high demand for improved performance and efficiency because of the desire to increase the range an aircraft can fly without stopping to refuel.

Today's modern gas turbine engines rely primarily on nickel base and cobalt base superalloys for the material of the engine components in many critical applications, such as turbine vane and blade applications. As operating temperatures increase, however, the property limits of the base alloy materials are being approached.

Accordingly, attempts have been made to use coatings to protect certain components within the engine from the harsh operating environment. In particular, thermal barrier coating systems are increasingly employed to protect turbine blades, thereby extending the life of the blades and permitting enhanced fuel economy.

A typical thermal barrier coating system includes a combination of two different coatings, one being a metallic material (bond coat) located on the superalloy substrate and the other being a ceramic material (top coat) located on the metallic material. Exemplary ceramic materials are described in U.S. Pat. Nos. Re. 33,876 and 4,321,311.

The metallic material is present on the entire outer surface of the airfoil section and provides the substrate with resistance to oxidation degradation. The metallic material is often an aluminide or a MCrAlY material, where M is nickel, cobalt, iron, or mixtures thereof. Exemplary MCrAlY materials known in the gas turbine industry are the NiCoCrAlY coatings described by Hecht et al. in U.S. Pat. No. 3,928,026 and the NiCoCrAlY+Hf+Si coatings described by Gupta et al. in U.S. Pat. No. 4,585,481.

In addition to providing the substrate with resistance to oxidation degradation and corrosion, the metallic material serves to bond the ceramic material to the substrate. However, the metallic material provides added weight to the engine which may adversely affect engine efficiency.

Also, most conventional metallic bond coat materials tend to be less ductile than the base alloy material at normal engine operating temperatures and thus a fatigue debit may also result.

Accordingly, scientists and engineers working under the direction of Applicant's Assignee continue to address the need for gas turbine engine airfoils capable of withstanding the harsh operating environment. There is a particular need for airfoils having increased fatigue strength. This invention results from such effort.

DISCLOSURE OF THE INVENTION

This invention is based in part on the discovery that by eliminating the metallic bond coat material from certain areas of an airfoil, fatigue strength is significantly improved.

According to the invention, an airfoil having improved fatigue strength is disclosed. An aspect of the invention includes an airfoil comprising a tip, a root section, a platform, and an airfoil section located between the tip and the platform. The airfoil section has a leading edge and a trailing edge. A metallic coating is located along the leading edge and the trailing edge excluding a portion of the leading edge and the trailing edge located near the platform. Applicant has discovered that it is this location near the platform which is a limiting high cycle fatigue and thermal mechanical fatigue location. Tests have confirmed that elimination of the metallic coating from the leading and trailing edges near the platform increases both the high cycle fatigue strength and thermal mechanical fatigue strength of the airfoil which results in a more durable design.

These and other advantages will become more apparent from the following drawings and detailed description of the Best Mode.

BEST MODE FOR CARRYING OUT THE INVENTION

Figure 1:
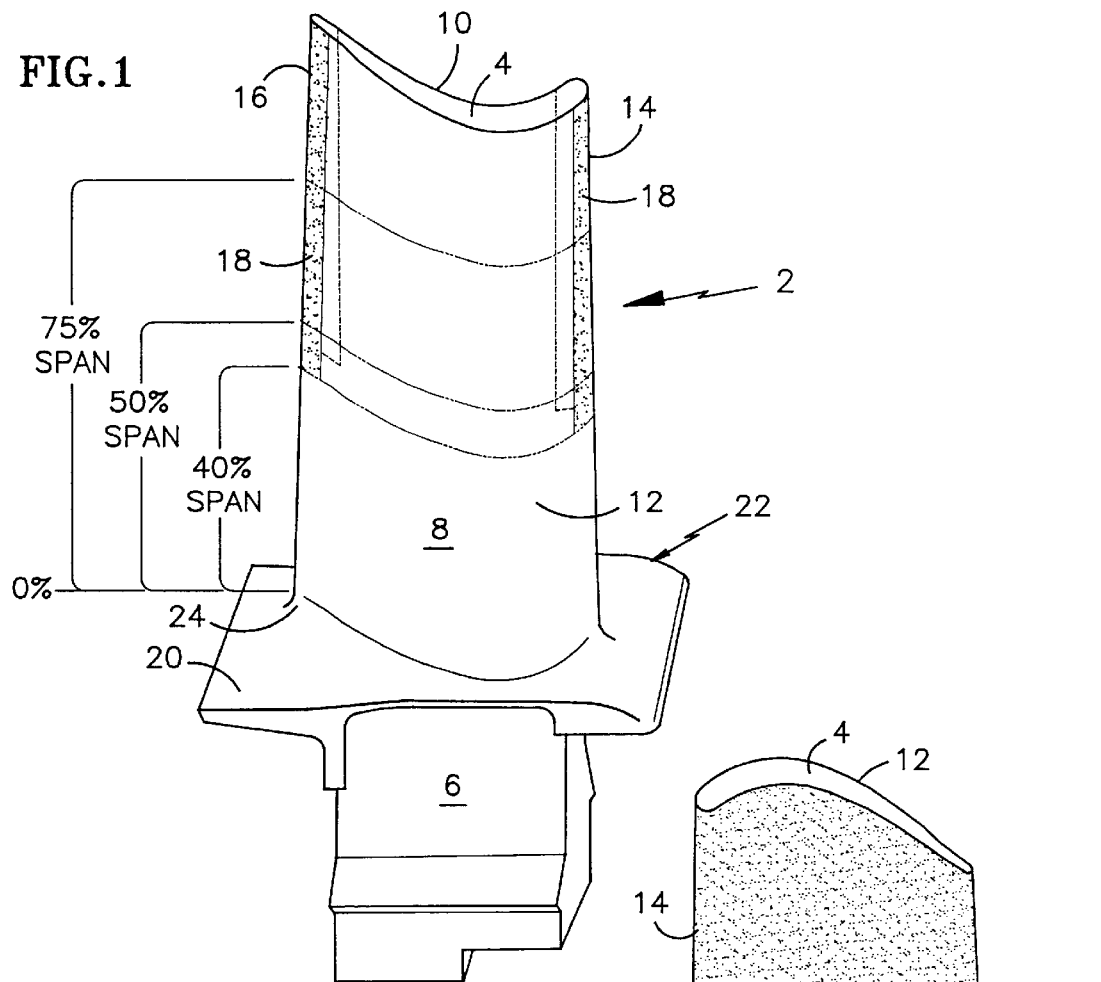
FIG. 1 is a schematic illustration of an embodiment of the invention.

The invention will be described by way of reference to a gas turbine engine blade which is meant to be an exemplary substrate rather than limiting. FIG. 1 shows a hollow turbine blade 2. The blade 2 has a tip 4, a root section 6, and an airfoil section 8 located between the tip 4 and the root section 6. The airfoil section 8 has a pressure surface 10 and a suction surface 12, as well as a leading edge 16 and a trailing edge 14.

Conventional fabrication techniques are employed to make the blade 2. The invention is applicable to, for example, cast superalloy airfoils including polycrystalline columnar grain and single crystal airfoils.

The material of the blade 2 may be any suitable material, such as a nickel base or cobalt base superalloy. In general, gas turbine engine airfoils are fabricated from nickel or cobalt base superalloys which may have been in either cast or wrought form. Nickel base superalloys are alloys based on nickel which are strengthened by the gamma prime phase ($Ni_3Al$, Ti). Such superalloys may contain chromium in amounts from about 8 to about 20 percent and also contain from about 10 to about 20 percent cobalt. Refractory metal additions such as Mo, W, Ta and Cb may also be present. The cobalt base superalloys do not contain a single predominant strengthening phase, but instead derive their strength from the presence of solid solution strengthening elements such as Mo, W, Ta, Cb and carbides which results from the presence of elements such as Cr, Ti and refractory metals. Carbon is present in alloys which rely on carbide strengthening. Chromium may be found in amounts of about 20 percent in cobalt superalloys.

More specifically, suitable single crystal nickel base superalloy compositions may include those described in U.S. Pat. No. 4,719,080 to Duhl et al., the contents of which are herein incorporated by reference. This patent discloses a broad compositional range, in weight percent, of 3–12Cr, 0–3Mo, 3–10W, 0–5Re, 6–12Ta, 4–7Al, 0–15Co, 0–0.045C, 0–0.02B, 0–0.1Zr, 0–0.8Hf, 0–2Nb, 0–1V, 0–0.7Ti, 0–10 (Ru+Rh +Pd+Os+Ir+Pt), 0–0.1Y, La, Sc, Ce, lanthanide or actinide series, balance Ni.

If a ceramic material is to be subsequently applied to blade 2 for increased thermal barrier protection at elevated operating temperatures, a preferred characteristic of the superalloy material suitable for blade 2 or other substrate is that it does not require a metallic bond coat material to bond the ceramic material to the substrate at elevated operating temperatures such as about 2100° F. (1149° C.). Most conventional superalloy materials require such a metallic bond coat. Applicant has found the composition, in weight percent, of 5Cr, 10Co, 1.9Mo, 5.9W, 3.0Re, 8.4Ta, 5.65Al, 0.25Hf, 0.013Y, balance essentially Ni to be particularly suitable as the substrate material for the invention in such a case.

After fabrication, the blade 2 is preferably cleaned by conventional techniques such as grit blasting. A coating 18 is then applied to the blade 2. Suitable coatings include those capable of providing oxidation and corrosion resistance. Preferably, the coating 18 is an aluminide coating or a MCrAlY coating where M is nickel, cobalt, iron or mixtures thereof. Suitable MCrAlY coatings include the NiCoCrAlY coatings described by Hecht et al. in U.S. Pat. No. 3,928,026 and the NiCoCrAlY+Hf+Si coatings described by Gupta et al. in U.S. Pat. No. 4,585,481 and U.S. Pat. No. Re. 32,121. The contents of U.S. Pat. Nos. 3,928,026; 4,585,481 and U.S. Pat. No. Re. 32,121 are herein incorporated by reference.

Applicant has found the MCrAlY coating described by Gupta et al. in the above patents to be particularly suitable. For example, Gupta et al. disclose a broad compositional range, in weight percent, of 5–40Cr, 8–35Al, 0–2Y, 0.1–7Si, 0.1–2Hf, balance selected from the group consisting of Ni, Co and mixtures thereof. In Table I Gupta et al. also disclose preferred compositions within the broad range depending upon the type of substrate employed as well as a composition optimized for ductility.

Any suitable technique known in the art may be employed for depositing the MCrAlY coating onto blade 2. For example, Gupta et al. disclose deposition techniques such as low pressure plasma spray and electron beam physical vapor deposition. The MCrAlY coating may be applied to any suitable thickness; a typical thickness is between about 0.003 inches (0.008 cm) and about 0.007 inches (0.018 cm).

Aluminide coatings are also known to provide oxidation and corrosion resistance for superalloy substrates such as gas turbine airfoils and thus are also suitable materials for coating 18. The aluminide coating may also be applied to any suitable thickness; a typical thickness of the aluminum-rich surface layer of an aluminide coating is about 0.001 inches (0.003 cm).

Aluminide coatings may be formed by a pack process wherein a powder mixture, including an inert material, a source of aluminum, and a halide activator is employed. The superalloy to be coated is inserted into a coating box and covered with the powder mixture or pack. The coating box is then placed in a retort. A reducing or inert gas is then flowed through the pack. During the coating process, the halide activator reacts with the source of aluminum and produces an aluminum-halide vapor which circulates over the surface of the superalloy article. Up on contact with the surface of the superalloy article, the vapor decomposes and deposits aluminum on the superalloy surface whereby the halide is released and contacts the aluminum source to continue the chemical reaction. The deposited aluminum then combines with nickel from the superalloy surface thereby forming an aluminum-rich surface layer or coating on the superalloy article.

Another known technique for forming an aluminum-rich surface layer on a superalloy article is a vapor phase aluminiding process. Generally, in this process the superalloy article is suspended in an out-of-contact relationship with the above described powder mixture as opposed to being embedded within the powder mixture.

Aluminide coatings are also described in U.S. Pat. Nos. 4,148,275; 4,005,989; 4,132,816; and 5,366,765, which are assigned to the present Assignee and incorporated herein by reference.

While Applicant does not claim to have invented a unique material for coating 18, the location of coating 18 on the airfoil is quite unique and advantageous. Specifically, Applicant has discovered that by applying coating 18 to select portions of blade 2, as opposed to the entire outer airfoil surface, the fatigue strength of blade 2 can be significantly improved.

Metallic coatings tend to be more brittle than the blade base alloy at typical engine operating temperatures. Thus, a blade having a metallic coating thereon may have a higher propensity for crack initiation at certain locations on the blade than that of a blade without such a metallic coating. Testing has shown that elimination of the metallic coating from the leading edge and trailing edge near the platform results in approximately a 40% increase in high cycle fatigue strength. Testing has also shown an increase in thermal mechanical fatigue capability of the blade when the metallic coating was not applied in this location.

As illustrated in FIG. 1, the coating 18 is located on portions of the leading edge 16 and trailing edge 14 of blade 2, as opposed to being conventionally located on the entire outer surface of the airfoil section 8. Preferably, coating 18 does not extend along the entire length of the leading edge 16 and trailing edge 14. As noted above, Applicant has discovered that an increase in fatigue capability of blade 2 may be achieved if coating 18 is not located at the bottom portion of the leading edge 16 and trailing edge 14 near the platform 22.

Coating 18 may extend along the leading edge 16 from the intersection of tip 4 and leading edge 16. Similarly, coating 18 may extend along the trailing edge 14 from the intersection of tip 4 and the trailing edge 14. However, coating 18 does not extend all the way down to the platform 22 on either the leading edge 16 or trailing edge 14. In general, Applicant has found that coating 18 should preferably not be applied along the leading edge 16 and the trailing edge 14 of blade 2 between about 0% span and about 25% span as conventionally measured from the flow path surface 20 of platform 22 radially outward toward the tip 4 (all references to percent span herein shall mean as measured from the flow path surface 20 of platform 22 radially outward toward the tip 4). At a maximum, coating 18 should not be applied along the leading edge 16 and the trailing edge 14 of blade 2 between about 0% span and about 40% span as shown in FIG. 1.

Applicant has determined that to achieve an increase in airfoil fatigue capability, coating 18 should not be applied in the high stress fields of airfoil section 8 which tend to be the portions of the leading edge 16 and trailing edge 14 located near platform 22. Specifically, Applicant has determined that at a minimum coating 18 should not be applied upon the airfoil to platform fillet region 24 on the leading edge 16 and trailing edge 14. Also, if any cooling holes are located on the leading edge 16, coating 18 should extend from the tip 4 along the leading edge 16 and stop approximately just above the bottom row of any cooling holes on the leading edge 16, provided such cooling holes are located within 0–40% span. Similarly, if discharge slots are located on the trailing edge 14, coating 18 should not be located on the trailing edge 14 in the region of approximately the bottom ten trailing edge discharge slots. Such features are often a limiting high cycle fatigue location and thus coating 18 should not be applied in those regions provided that the features are also located within 0–40% span.

During engine operation most turbine blades are typically hottest between about 50% span and about 75% span. Experience with testing of metallic bond coat materials located on the entire outer surface of an airfoil section and under a ceramic thermal barrier material has shown that above approximately 40% span, spallation of the ceramic material may occur along the leading and trailing edges of the airfoil, thereby exposing the underlying metallic bond coat material. Thus, elimination of the metallic bond coat material from the leading and trailing edges above 40% span is not recommended because this may result in undesirable exposure of base metal alloy upon spallation of ceramic material.

More specifically, the leading edges of airfoils beyond approximately 50% span may experience some spallation due to spalling outer airseals which may liberate small amounts of material that may impact the leading edges of downstream airfoils. Furthermore, any material in the gas flow stream can potentially spall the ceramic material on the leading edges of the airfoils. However, there is little risk of spallation on the leading edge near the platform because spallation does not typically occur this far inboard.

During engine operation the temperature of the trailing edge of the airfoil near the platform is typically not as hot as the portions of the airfoil within the 50%–75% span. However, above approximately 40% span the trailing edge of an airfoil runs much hotter than that of the airfoil portions near the platform and is difficult to cool due to its geometry. Thus, maintaining a metallic bond coat material on the trailing edge above approximately 40% is desirable. In addition, during engine operation spallation does not typically occur along the trailing edge near the platform, up to about 40% span because any debris within the engine is typically spun centrifugally outward and thus does not impact the trailing edge near the platform of the airfoil.

In a preferred embodiment of the invention, coating 18 is not substantially located on the pressure surface 10 or suction surface 12 of the airfoil section 8, as shown in FIG. 1. In general, coating 18 may extend axially for about 0.25 inches (0.64 cm) to about 0.50 inches (1.27 cm) on the pressure surface 10 and for about 0.25 inches (0.64 cm) to about 0.50 inches (1.27 cm) on the suction surface 12 of the airfoil section 8 as measured from the leading edge 16, respectively. Similarly, coating 18 may extend axially for about 0.25 inches (0.64 cm) to about 0.50 inches (1.27 cm) on the pressure surface 10 and for about 0.25 inches (0.64 cm) to about 0.50 inches (1.27 cm) on the suction surface 12 of the airfoil section 8 as measured from the trailing edge 14, respectively, such that the hottest regions of the pressure surface 10 and suction surface 12 near the trailing edge 14 are coated.

One skilled in the art would appreciate that the above described axially distances may vary depending upon factors such as size of the blade 2, thickness of the leading edge 16, angular orientation of the leading edge 16, as well as airfoil section 8 base metal temperature capability.

Conventional masking techniques may be employed prior to application of coating 18 to ensure that coating 18 is applied where desired.

Testing has confirmed that it is possible to exclude coating 18 substantially from the pressure surface 10 and the suction surface 12 of the airfoil section 8 because such surfaces are not susceptible to severe impact damage, for example, foreign object damage. Additionally, these surfaces of the airfoil 8 can be easily cooled by flowing cooling air along the surfaces via cooling holes located where such cooling is needed.

Figure 2:
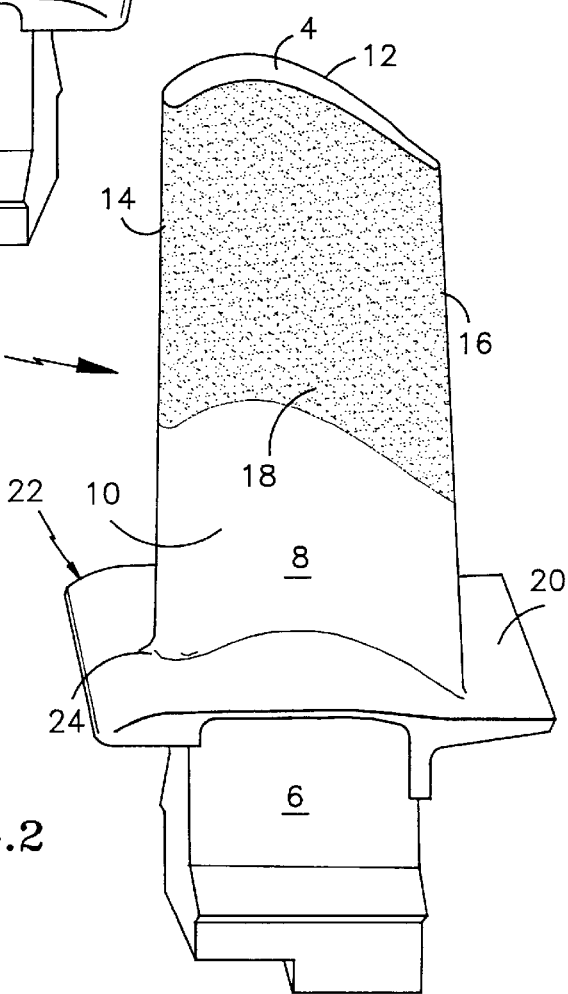
FIG. 2 is a schematic illustration of another embodiment of the invention.

In another embodiment of the invention, coating 18 is applied on the leading edge 16 and trailing edge 14, as described above, as well as on the pressure surface 10 and suction surface 12 of the airfoil 8 immediately adjacent thereto, as, for example, shown in FIG. 2. However, this embodiment is suitable but not preferred because of the added weight to the engine due to the increased amount of coating 18 present on the airfoil section 8.

In yet other embodiments of the invention, an aluminide coating as described above may be applied to the entire outer surface of the airfoil section 8. Coating 18 in MCrAlY form may then be applied as described above. Alternatively, coating 18 in MCrAlY form may be applied to the airfoil section 8 as described above. An aluminide coating may then applied over the coating 18 and upon the entire outer surface of the airfoil section 8. These embodiments provide added protection against corrosion and oxidation degradation.

Typically, all masking material will then be removed. If desired, a suitable ceramic material may be applied over the airfoil section 8 of the blade 2. The ceramic material may include that which is described in U.S. Pat. Nos. Re. 33,876; 4,321,311; 4,405,659; 4,405,660; 5,262,245; and 5,087,477, the contents of which are herein incorporated by reference. Exemplary ceramic materials include zirconia stabilized by magnesia, ceria or yttria applied by techniques such as electron beam physical vapor deposition or plasma spray deposition. Applicant has found yttria stabilized zirconia to be a particularly suitable ceramic material.

It should also be noted that tip 4 is typically not a limiting fatigue location. One skilled in the art would recognize that tip 4 may be conventionally treated/coated with suitable materials known in the art, such as cubic boron nitride, depending upon desired application.

An advantage of the invention is an increase in airfoil fatigue strength. Another advantage of the invention is that coating 18 is eliminated from the airfoil's convex side mid-chord region near platform 22 which may also be a limiting fatigue location when coated. Yet another advantage of the invention is that airfoils of the invention have reduced weight which results in improved engine efficiency.

While the invention has been shown with respect to detailed embodiments thereof, various changes in form and detail may be made without departing from the spirit and scope of the claimed invention.

What is claimed is:

1. A cast gas turbine jet engine airfoil comprising a tip; a root section; a platform having a flow path surface; and an airfoil section located between the tip and the platform, said airfoil section having a leading edge and a trailing edge wherein a metallic coating is located along the leading edge and the trailing edge at about equal distances excluding a portion of the leading edge and the trailing edge located adjacent to the platform, said cast gas turbine jet engine airfoil having enhanced fatigue strength and reduced weight.

2. The airfoil of claim 1 wherein the metallic coating is located along the leading edge and the trailing edge excluding the portion of the leading edge and the trailing edge in the airfoil to platform fillet region.

3. The airfoil of claim 1 wherein the airfoil has a compositional range, in weight percent, of, 3–12Cr, 0–3Mo, 3–10W, 0–5Re, 6–12Ta, 4–7Al, 0–15Co, 0–0.045C, 0–0.2B, 0–0.1Zr, 0–0.8Hf, 0–2Nb, 0–1V, 0–0.7Ti, 0–10(Ru+Rh+Pd+Os+Ir+Pt), 0–0.1Y, La, Sc, Ce, lanthanide or actinide series, balance Ni.

4. The airfoil of claim 1 wherein the airfoil has a composition of 5Cr, 10Co, 1.9Mo, 5.9W, 3.0Re, 8.4Ta, 5.65Al, 0.25Hf, 0.013Y, balance essentially Ni.

5. The airfoil of claim 1 wherein the metallic coating is a MCrAlY coating wherein M is nickel, cobalt, iron or mixtures thereof.

6. The airfoil of claim 5, wherein the MCrAlY coating is, in weight percent, 5–40Cr, 8–35Al, 0–2Y, 0.1–7Si, 0.1–2Hf, balance selected from the group consisting of Ni, Co and mixtures thereof.

7. The airfoil of claim 5 wherein an aluminide coating is located on the airfoil section under the MCrAlY coating.

8. The airfoil of claim 5 wherein an aluminide coating is located on the airfoil section over the MCrAlY coating.

9. The airfoil of claim 1 wherein the metallic coating is an aluminide coating.

10. The airfoil of claim 1 wherein the metallic coating extends along the leading edge and the trailing edge, excluding the portion of the leading edge and the trailing edge as measured from the flow path surface of the platform radially outward toward the tip for approximately a 25% span.

11. The airfoil of claim 10 wherein the metallic coating is further located on the surfaces of the airfoil section bounded by the metallic coating on the leading edge and the trailing edge.

12. The airfoil of claim 1 wherein the metallic coating extends along the leading edge and the trailing edge, excluding the portion of the leading edge and the trailing edge as measured from the flow path surface of the platform radially outward toward the tip for approximately a 40% span.

13. The airfoil of claim 12 wherein the metallic coating is further located on a portion of the surfaces of the airfoil section bounded by the metallic coating on the leading edge and the trailing edge.

14. The airfoil of claim 1 further including a ceramic material located on the airfoil section.

15. The airfoil of claim 1 wherein the airfoil is a turbine blade.

16. A method of producing a fatigue resistant and reduced weight, cast gas turbine jet engine airfoil comprising the steps of:
   a) providing a cast gas turbine jet engine airfoil comprising a tip; a root section; a platform having a flow path surface; and an airfoil section located between the tip and the platform, said airfoil section having a leading edge and a trailing edge; and
   b) providing a metallic coating along the leading edge and the trailing edge of the cast gas turbine jet engine airfoil at about equal distances excluding a portion of the leading edge and the trailing edge located adjacent to the platform, said cast gas turbine jet engine airfoil having enhanced fatigue strength and reduced weight.

17. The airfoil of claim 1 wherein the airfoil section has a suction surface and a pressure surface, the metallic coating extending axially for about 0.25 inches to about 0.50 inches on the pressure surface and for about 0.25 to about 0.50 inches on the suction surface as measured from the leading edge, respectively, the metallic coating also extending axially for about 0.25 inches to about 0.50 inches on the pressure surface and for about 0.25 to about 0.50 inches on the suction surface as measured from the trailing edge, respectively.

18. A cast gas turbine jet engine airfoil comprising a tip; a root section; a platform having a flow path surface; and an airfoil section located between the tip and the platform, said airfoil section having a leading edge and a trailing edge, said airfoil section further comprising a metallic coating located along the leading edge and the trailing edge excluding a portion of the leading edge and the trailing edge located adjacent to the platform.

19. The airfoil of claim 18, wherein the airfoil has a compositional range, in weight percent of, 3–12Cr, 0–3Mo, 3–10W, 0–5Re, 6–12Ta, 4–7Al, 0–15Co, 0–0.045C, 0–0.2B, 0–0.1Zr, 0–0.8Hf, 0–2Nb, 0–1V, 0–0.7Ti, 0–10(Ru+Rh+Pd+Os+Ir+Pt), 0–0.1 Y, La, Sc, Ce, lanthanide or actinide series, balance Ni.

20. The airfoil of claim 18, wherein the airfoil has a composition of 5Cr, 10Co, 1.9Mo, 5.9W, 3.0Re, 8.4Ta, 5.65Al, 0.25Hf, 0.013Y, balance essentially Ni.

21. The airfoil of claim 18, wherein the metallic coating is a MCrAlY coating wherein M is nickel, cobalt, iron or mixtures thereof.

22. The airfoil of claim 21, wherein the MCrAlY coating is, in weight percent, 5–40Cr, 8–35Al, 0–2Y, 0.1–7Si, 0.1–2Hf, balance selected from the group consisting of Ni, Co and mixtures thereof.

23. The airfoil of claim 21, wherein an aluminide coating is located on the airfoil section under the MCrAlY coating.

24. The airfoil of claim 21, wherein an aluminide coating is located on the airfoil section over the MCrAlY coating.

25. The airfoil of claim 18, wherein the metallic coating is an aluminide coating.

26. The airfoil of claim 18, wherein the metallic coating extends along the leading edge and the trailing edge, excluding the portion of the leading edge and the trailing edge between about the 0% span and about 25% span as measured from the flow path surface of the platform radially outward toward the tip.

27. The airfoil of claim 18, wherein the metallic coating extends along the leading edge and the trailing edge, excluding the portion of the leading edge and the trailing edge as measured from the flow path surface of the platform radially outward toward the tip for approximately a 40% span.

28. The airfoil of claim 18, wherein the metallic coating is further located on the surfaces of the airfoil section bounded by the metallic coating on the leading edge and the trailing edge.

29. The airfoil claim 27, wherein the metallic coating is further located on a portion of the surfaces of the airfoil section bounded by the metallic coating on the leading edge and the trailing edge.

30. The airfoil of claim 18, further including a ceramic material located on the airfoil section.

31. The airfoil of claim 18, wherein the airfoil is a turbine blade.

* * * * *

UNITED STATES PATENT AND TRADEMARK OFFICE
CERTIFICATE OF CORRECTION

PATENT NO.   : 6,095,755
DATED        : August 1, 2000
INVENTOR(S)  : Houston

It is certified that error appears in the above-identified patent and that said Letters Patent is hereby corrected as shown below:

<u>Column 7,</u>
Line 1, delete "0-0.2B" and insert -- 0-0.02B -- therefor; and

<u>Column 8,</u>
Line 17, delete "0-0.2B" and insert -- 0-0.02B -- therefor.

Signed and Sealed this

Eighteenth Day of May, 2004

JON W. DUDAS
*Acting Director of the United States Patent and Trademark Office*